United States Patent Office 3,507,166
Patented Apr. 21, 1970

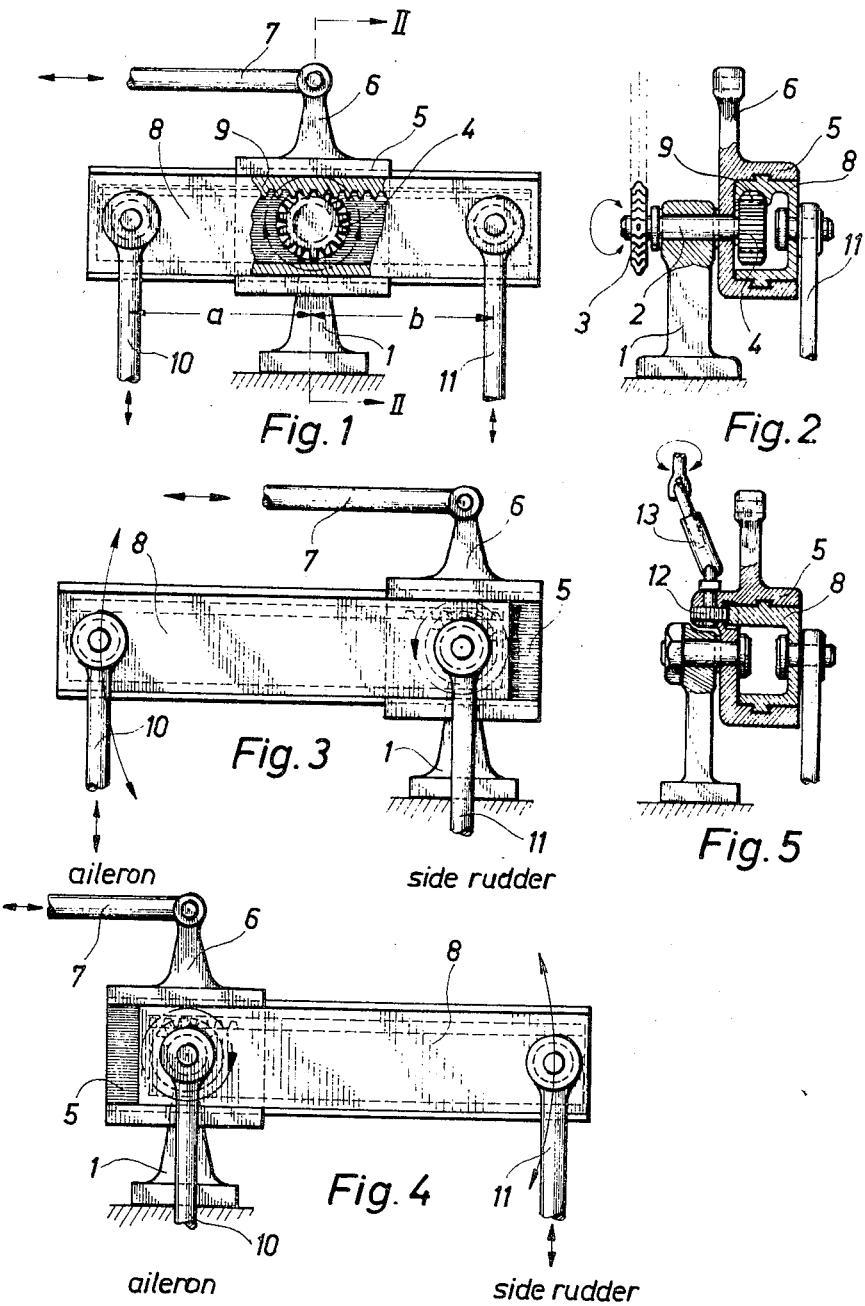

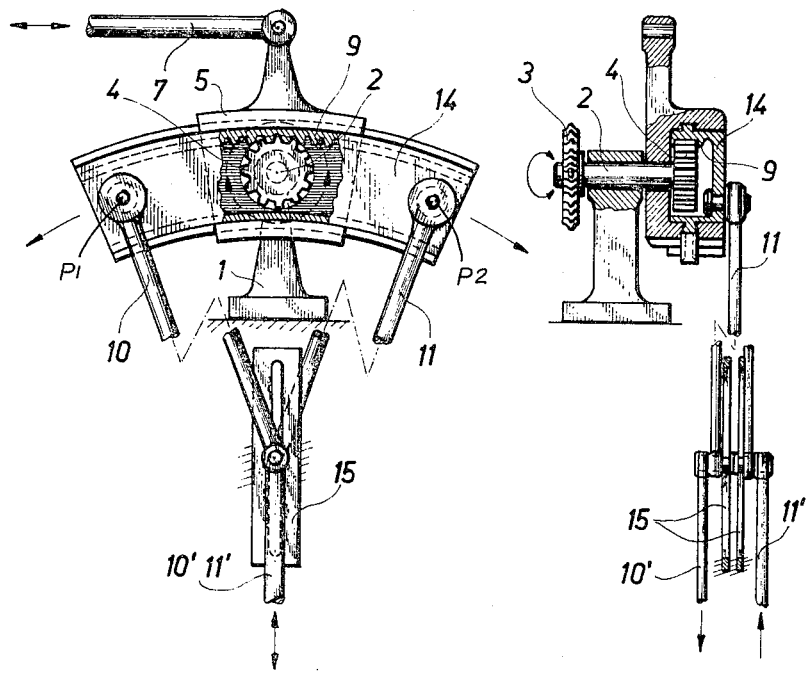
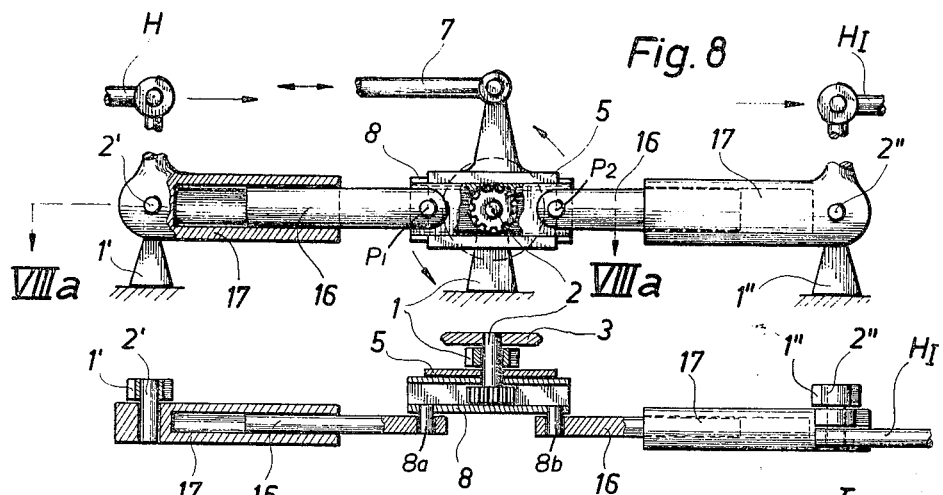

3,507,166
VARIABLE LEVER TRANSMISSION FOR ACTUATING THE CONTROL SURFACES OF AIR AND WATER VEHICLES
Frank Arnold Nix, Frankfurt am Main, Germany, assignor to Vereinigte Flugtechnische Werke Gesellschaft mit beschrankter Haftung fruher "Weser" Flugzeugbau Focke-Wulf Heinkel-Flugzeugbau, Bremen, Germany
Filed Apr. 15, 1968, Ser. No. 721,229
Int. Cl. G05g 9/00
U.S. Cl. 74—522                              3 Claims

ABSTRACT OF THE DISCLOSURE

A variable lever transmission for the control of control surfaces of aircrafts and water vehicles in which the transmission ratio is variable by displacing the joint of one lever relative to the joint of another lever, two oppositely directed output movements being derived from a lever which latter is displaceably mounted in guiding means pivotally supported by stationary supporting means.

---

Figure 9:
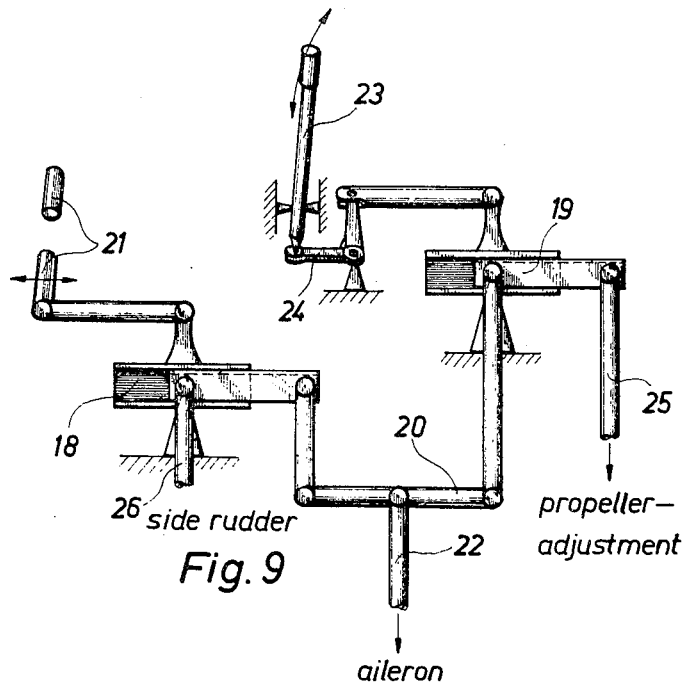

The present invention concerns a variable lever transmission for the actuation of control surfaces of air and water vehicles in which the transmission ratio is by displacement of a joint of one lever relative to the joint of another lever variable within a lever rail.

With aircraft having aerodynamically effective control devices on tiltable lift surfaces, there exists the drawback that the axis about which the control moment is effective varies in conformity with the position of the tiltable lift surfaces.

On a convertible aircraft equipped with tiltable wings, the control means arranged on the wings are adapted during a normal horizontal flight to act as ailerons and to bring about moments about the longitudinal axis of the aircraft, whereas when taking off vertically with the wings tilted by 90°, a deviation of said control means produces a torque about the vertical axis.

It is an undue strain on the pilot when a certain control command released by him, depending on the position of the tiltable lift surfaces, brings about different movements of the aircraft. Therefore, the control has to be so designed that a command released by the pilot will always result in one and the same control moment. Applied to a convertible aircraft, this means that a deviation of the side rudder pedals, which deviation has to produce a moment about the vertical axis, will during horizontal flight act upon the side rudder in customary manner whereas in a vertical hovering flight it must act upon the ailerons. Furthermore, in all possible intermediate positions of the tiltable lift surfaces, it is necessary that the effects of the control commands are mixed correspondingly so that no undesired moments act upon the aircraft. Therefore, it is necessary to find a device by means of which the movement initiated by the control lever, for instance the control pedals, will as to its action upon two control elements, for instance ailerons and side rudder, at any desired transmission ratio be so mixed that with an increase of the transmission ratio between control lever and the first control member a decrease in the transmission ratio between the control lever and the second control member will occur.

It is known to vary the transmission ratio between a picked up movement and a released movement by varying the spacing of the point of attack of the releasing linkage from the axis of rotation of the device. Accordingly, it has been suggested tiltably to arrange a fork and to cause a stud in a slot of this fork to be taken along during the movement. Depending on the spacing of the stud from the pivot of the fork, the stroke of the stud will be different at the same angular deviation of the fork.

The practical realization of this suggestion is relatively complicated inasmuch as for each released movement a device is necessary, and for each device a separate cable drive is required.

For use in connection with airplane controls, a linkage system has been suggested according to which a released signal has a ratio variable up to the value zero with regard to the picked up signal so that with the picked up movement a ring is tilted which has a circumferential solt, and the lever from which the released movement is derived can be tilted in the plane of said ring and in said slot by an angle of 90°, in which instance the output or released movement becomes zero when the output lever is located in the extension of the tilting axis of the ring, whereas it assumes a maximum value in the position offset by 90°. With this design, merely a variable output movement is obtained.

It is an object of the present invention to provide two output movements while with the same input movement the increase in the size of one output movement is accompanied by a decrease in the size of the other output movement.

It is another object of this invention to provide an arrangement as set forth in the preceding paragraph, in which the input movement will in a simple manner be so split up and the transmission ratio of this split-up will be so varied that with an increase in the output movement I, a decrease in the output movement II will occur.

These and other objects and advantages of the invention will appear more clearly from the following specification in connection with the accompanying drawings, in which:

FIG. 1 diagrammatically illustrates a front view of a variable lever transmission according to the invention.

FIG. 2 is a section along the line II—II of FIG. 1.

FIGS. 3 and 4 respectively represent partial views of the lever transmission according to FIGS. 1 and 2.

FIGS. 5 to 8 respectively represent further embodiments of the lever transmission according to the invention.

FIG. 8a is a section along the line VIIIa—VIIIa of FIG. 8.

Figure 10:
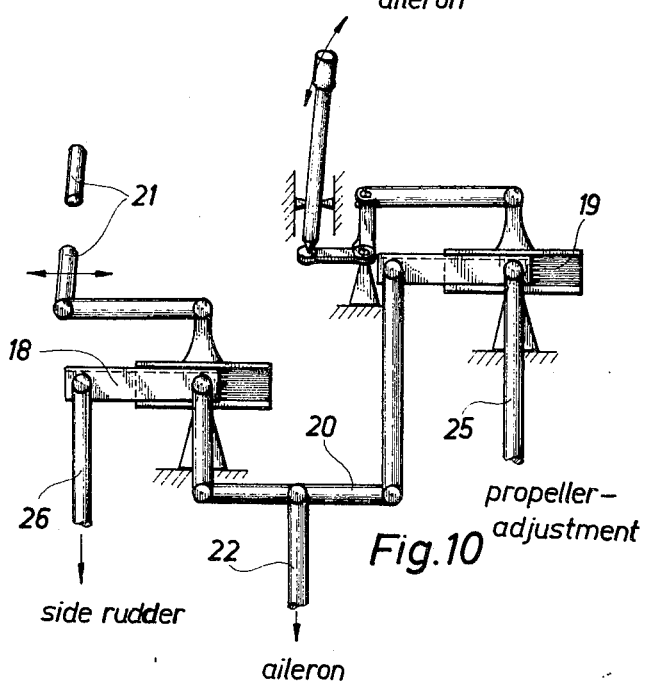

FIGS. 9 and 10 respectively illustrate two examples for use of the invention in connection with two lever transmissions.

The objects according to the present invention have been realized by deriving two oppositely directed output movements from a lever rail and by displaceably mounting the lever rail in guiding means adapted to be tilted about a fixed bearing point, the arrangement being such that in the end positions of the lever rail one of the output movements becomes zero.

According to a further development of the invention, the adjusting mechanism for adjusting the effective length is positively kinematically connected with the tilting mechanism for tilting the lift surfaces.

With a complete control installation in case of a convertible airplane, the two lever transmissions cooperate in such a way that two of the four movement outputs are mixed in a mixing lever. In such an instance, merely by way of example, a movement output acts upon the adjustment of the propeller, another acts upon the side rudder and two act upon the mixing lever, the movement output of which in its turn actuates the aileron.

Referring now to the drawings in detail, the carrier 1 which is fixedly connected to the vehicle, has journalled therein a shaft 2 one end of which carries a sprocket wheel 3 while the other end carries a gear 4. Rotatably mounted on shaft 2 is a guiding member 5 carrying a lever pivot 6. A control rod 7 is pivotally connected to pivot 6. A lever rail 8 is slidably guided in the guiding member 5. The upper inner surface of the lever rail 8 has inner teeth 9 meshing with the gear 4. Connecting rods 10 and 11 are respectively connected to the ends of the lever rail 8. A movement of the control rod 7 will thus be translated to the control rods 10 and 11 at the ratio of the length of the lever arms $a$ and $b$.

In the specific example referred to above, the sprocket wheel 3 is through a chain connected to the servomotor for tilting the wings. The control rod 7 is in this instance connected to the side control pedals, whereas the control rod 10 would act upon the ailerons, and the control rod 11 would act upon the side rudder.

In vertical hovering flight, the lever rail 8 will then occupy the position shown in FIG. 3. A movement of the side rudder pedals is translated exclusively into a movement of the ailerons. When during the transition from vertical flight to horizontal flight the wings are tilted, the lever rail 8 is displaced to the position of FIG. 4. In this instance an actuation of the pedals acts fully upon the side rudder.

It is, of course, understood that this arrangement is advanced merely by way of example. The individual elements can, of course, be replaced by kinematically equivalent other elements.

A slight disturbance could, of course, occur when during the tilting of the guiding means 5 the lever rail 8 carries out a slight movement relative to the guiding means 5 which is due to the fact that the gear 4 is at a standstill. This is caused by the fact that the momentary pole of the movement of the lever rail 8 is not located on the central axis of shaft 2 but in the respective meshing teeth of the teeth 9.

When the deviations are slight, for instance, when the output movements do not act directly upon the rudder and control members but act upon servo-valves, this influence is negligible. If, however, this influence should become undesirably great, it can be avoided by a drive according to FIG. 5. According to FIG. 5 the lever rail 8 is driven by a gear 12 which turns together with the guiding member 5. The gear 12 is driven by a double cardanic shaft 13.

FIGS. 6 and 7 illustrate how also slight overlapping influences due to the movement of the lever rail can be avoided. According to this embodiment, a curved lever rail 14 is provided. The control rods 10' and 11' are adapted to slide in guiding means 15 and 15' respectively by means of separate sliding pivots. When the control rod 7 occupies its intermediate position, a displacement of the lever rail 14 no longer results in a slight movement of the control rods.

It will be obvious that by adjusting rail 14 so that either pivot P1 or pivot P2 is in axial alignment with shaft 2, positions are obtainable which correspond to those of FIGS. 3 and 4 respectively.

One of the further possibilities to pick up the movement is shown in FIG. 8. According to FIG. 8, the linkage 16 associated with the lever rail comprises transmission elements subjected to bending stresses. They are adapted to slide in the hollow arm of a rocker 17 and thus convey the movement. Also in this instance pivots 8a and 8b can selectively be brought into alignment with shaft 2.

It will be appreciated that by first turning sprocket wheel 3 in one or the other direction, rail 8 is moved to the left or to the right, thereby pushing one arm or link 16 further into the hollow arm of the respective rocker 17 while pulling the other arm or linkage 16 by a corresponding distance out of the respective hollow arm of rocker 17 pertaining thereto. In this way the lever arms 2'–8a and 2"–8b are changed so that pivoting of rail 8 by means of control rod 7 will transfer a different movement onto rod H than onto rod HI.

Finally, there will now be shown how with a vertically starting aircraft with tiltable wings the control about the longitudinal and vertical axis may be designed for the application of the lever transmission according to the invention. The problem presents itself as follows. During hovering flight, the movement of the aircraft about the longitudinal axis can be brought about by changing the pitch of the propeller blades in opposite direction. The movement about the vertical axis may be realized by an adjustment of the ailerons. When cruising, the ailerons and side rudders are effective in customary manner.

An arrangement of the lever transmission in the control linkage is shown in FIGS. 9 and 10. Two of the described movable lever transmissions 18 and 19 are provided and there is furthermore provided a mixing lever 20. In the position shown in FIG. 9, which corresponds to the position during hovering flight, a movement of the side rudder pedals 21 is through the intervention of the lever transmission 18 translated to the mixing lever 20 and from here acts upon the ailerons through the control rod 22. A lateral adjustment of the control stick 23 is by means of the angle lever 24 translated to the lever arrangement 19 and by means of the control rod 25 acts upon the propeller adjusting mechanism.

In the cruising position according to FIG. 10, the two lever transmissions 18 and 19 are moved to their other extreme position, and a movement of the side rudder pedals 21 is translated into a movement of the control rod 26 acting upon the side rudder. The movement of the control stick acts through the lever transmission 19 upon the mixing lever 20 and from there through control rod 22 upon the aileron.

It is, of course, to be understood that the present invention is, by no means, limited to the particular arrangements shown in the drawings but also comprises any modifications within the scope of the invention.

What I claim is:

1. A variable lever transmission for controlling the control surfaces of aircrafts and water vehicles which includes: guiding means, pivot means pivotally supporting said guiding means, stationary supporting means supporting said pivot means, rail means guided by and displaceable relative to said guiding means, and two rod means spaced from each other in the longitudinal direction of said rail means and pivotally connected to said rail means, said rail means being movable selectively from a position in which the pivotal connections of said two rod means with said rail means are located on opposite sides of said pivot means to a position in which the pivot axis of either one of said two rod means at least approximately coincides with the pivot axis of said pivot means, said rail means being curved, and additional guiding means common to and guiding those ends of said two rod means which are remote from said rail means.

2. A variable lever transmission for controlling the control surfaces of aircrafts and water vehicles, which includes: guiding means, pivot means pivotally supporting said guiding means, first stationary supporting means supporting said pivot means, rail means guided by and displaceable relative to said guiding means, second and third stationary supporting means arranged on opposite sides of said first stationary supporting means and spaced from each other in the longitudinal direction of said rail means, first and second lever means respectively pivotally supported by said second and third stationary supporting means, and two extension members respectively pivotally connected to the end portions of said rail means and extending in the direction toward said second and third stationary supporting means, each of said first and second lever means including means respectively telescopically engaging the respective adjacent extension members.

3. A control system for controlling the control surfaces of aircrafts and water vehicles, which includes: two variable lever transmissions; each of said lever transmissions comprising guiding means, pivot means pivotally supporting said guiding means, stationary supporting means supporting said pivot means, rail means guided by and displaceable relative to said guiding means, and a first rod means and a second rod means spaced from each other in the longitudinal direction of said rail means and pivotally connected to said rail means, said rail means being movable selectively from a position in which the pivotal connections of said first and second rod means with said rail means are located on opposite sides of said pivot means to a position in which the pivot axis of either one of said first and second rod means at least approximately coincides with the pivot axis of said pivot means; and mixing lever means adapted to be operatively connected to a member to be controlled and being operatively pivotally connected at one end to one rail means of one of said lever transmissions and at the other end to one lever means of the other rail transmission.

References Cited

UNITED STATES PATENTS

| 273,276 | 3/1883 | Hawkinson | 74—522 |
|---|---|---|---|
| 2,725,203 | 11/1955 | Blatz et al. | 244—83 |
| 3,330,477 | 7/1967 | Stephens | 74—522 X |

MILTON KAUFMAN, Primary Examiner

U.S. Cl. X.R.

244—83